(12) United States Patent
Osman et al.

(10) Patent No.: US 9,542,975 B2
(45) Date of Patent: Jan. 10, 2017

(54) CENTRALIZED DATABASE FOR 3-D AND OTHER INFORMATION IN VIDEOS

(75) Inventors: Steven Osman, San Francisco, CA (US); Vlad Stamate, Hayward, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 192 days.

(21) Appl. No.: 12/911,688

(22) Filed: Oct. 25, 2010

(65) Prior Publication Data

US 2012/0102023 A1   Apr. 26, 2012

(51) Int. Cl.
| | | |
|---|---|---|
| G06F 7/00 | (2006.01) | |
| G06F 17/30 | (2006.01) | |
| G11B 27/034 | (2006.01) | |
| G11B 27/036 | (2006.01) | |

(52) U.S. Cl.
CPC ........... *G11B 27/034* (2013.01); *G11B 27/036* (2013.01)

(58) Field of Classification Search
CPC ................................................ G06F 17/30817
See application file for complete search history.

(56) References Cited

U.S. PATENT DOCUMENTS

| | | | |
|---|---|---|---|
| 6,603,474 B1 | 8/2003 | Cobb et al. | |
| 7,220,003 B2 | 5/2007 | Eguchi | |
| 8,120,606 B2 | 2/2012 | Nakamura et al. | |
| 2003/0001846 A1* | 1/2003 | Davis ................... | G11B 27/031 345/474 |
| 2004/0220926 A1* | 11/2004 | Lamkin et al. ................... | 707/3 |
| 2004/0223190 A1 | 11/2004 | Oka | |
| 2004/0236791 A1* | 11/2004 | Kinjo .......................... | 707/104.1 |
| 2004/0239679 A1* | 12/2004 | Ito et al. ........................ | 345/555 |
| 2005/0027687 A1 | 2/2005 | Nowitz et al. | |
| 2006/0101065 A1 | 5/2006 | Tsutsui et al. | |
| 2008/0019576 A1 | 1/2008 | Senftner et al. | |
| 2008/0074424 A1 | 3/2008 | Carignano | |
| 2008/0162450 A1* | 7/2008 | McIntyre et al. ................. | 707/5 |
| 2008/0292213 A1 | 11/2008 | Chau | |
| 2009/0002368 A1* | 1/2009 | Vitikainen et al. ........... | 345/422 |
| 2009/0083260 A1* | 3/2009 | Artom et al. ..................... | 707/5 |

(Continued)

FOREIGN PATENT DOCUMENTS

| | | |
|---|---|---|
| CN | 101542536 A | 9/2009 |
| CN | 101563698 A | 10/2009 |

(Continued)

OTHER PUBLICATIONS

Takeshi Yamaguchi Real-Time image plane full-color and full parrallax holographic video display system; Optical Engingeering;2007; pp. 1-18.*

(Continued)

*Primary Examiner* — Jeff A Burke
*Assistant Examiner* — Jermaine Mincey
(74) *Attorney, Agent, or Firm* — Kilpatrick Townsend & Stockton LLP

(57) ABSTRACT

Methods and systems for a centralized database for 3-D and other information in videos are presented. A centralized database contains video metadata such as camera, lighting, sound, object, depth, and annotation data that may be queried for and used in the editing of videos, including the addition and removal of objects and sounds. The metadata stored in the centralized database may be open to the public and admit contributor metadata.

24 Claims, 9 Drawing Sheets

(56) References Cited

U.S. PATENT DOCUMENTS

| | | |
|---|---|---|
| 2009/0138906 A1 | 5/2009 | Eide |
| 2009/0183210 A1* | 7/2009 | Andrade .................. 725/87 |
| 2009/0237417 A1* | 9/2009 | Gadot ..................... 345/629 |
| 2009/0307201 A1* | 12/2009 | Dunning et al. ............. 707/4 |
| 2010/0027961 A1 | 2/2010 | Gentile et al. |
| 2010/0034457 A1 | 2/2010 | Berliner et al. |
| 2010/0057694 A1* | 3/2010 | Kunjithapatham et al. ...... 707/3 |
| 2012/0075490 A1* | 3/2012 | Tsai ............... G06Q 30/0241 348/222.1 |

FOREIGN PATENT DOCUMENTS

| | | |
|---|---|---|
| EP | 2444971 A2 | 4/2012 |
| JP | 63002497 A2 | 1/1988 |
| JP | 8331603 A | 12/1996 |
| JP | A 2001-022952 | 1/2001 |
| JP | A 2004-048252 | 2/2004 |
| JP | A 2004-264907 | 9/2004 |
| JP | 2005-136751 A | 5/2005 |
| JP | 2006-72255 A | 3/2006 |
| JP | A 2008-092557 | 4/2008 |
| JP | 2009186258 A | 8/2009 |
| JP | 2009193096 A | 8/2009 |
| JP | 2009244138 A | 10/2009 |
| JP | A 2004-048252 | 4/2010 |
| JP | A 2010-510573 | 4/2010 |
| WO | WO 2005/076618 A1 | 8/2005 |
| WO | WO 2005076618 A1 * | 8/2005 ........... G11B 27/036 |
| WO | WO 2007/035558 A2 | 3/2007 |
| WO | WO 2007/035568 A2 | 3/2007 |
| WO | 2008/063170 | 5/2008 |
| WO | WO 2008/063170 A1 | 5/2008 |
| WO | WO 2008/063168 A9 | 5/2009 |

OTHER PUBLICATIONS

International Search Report and Written Opinion mailed on Apr. 9, 2012, for PCT Application No. PCT/US2011/052824, filed Sep. 22, 2011, 10 pages.
Partial European Search Report dated Aug. 21, 2012.
Extended European Search Report dated Jan. 16, 2013.
CN201180062687.6, "Office Action", Apr. 22, 2016, 16 pages (including English translation).

* cited by examiner

CENTRALIZED DATABASE FOR 3-D AND OTHER INFORMATION IN VIDEOS

BACKGROUND

1. Field of the Invention

Embodiments of the present invention relate to the storage and sharing of video metadata, in general, and in particular, to a centralized server that stores video metadata, such as camera, lighting, sound, object, depth, and annotation data, which can be used to generate 3-D images, add or remove objects from a scene with proper lighting and sound effects, provide annotations, or edit scenes. The metadata may be provided by parties associated with the video or by unassociated contributors, such as internet users.

2. Background

Video production techniques now may not store or make available potentially captured metadata. Video editing techniques are often manually done, such as estimating the required light qualities of an object filmed with a blue screen background that is to be inserted into an existing video.

BRIEF SUMMARY

One embodiment of the present invention is directed to a method comprising of receiving video data to be displayed on a display, the video data comprising a video identifier, querying a server, with the video identifier, for video metadata stored on the server, the video identifier identifying the video metadata and the video metadata comprising video lighting location metadata describing a location of a light source with respect to a camera that captured the video data, receiving the video metadata from the server and editing the video data with the received video lighting location metadata to produce edited video data that relights the video data consistent with the video lighting location metadata, and outputting the edited video data to the display.

Another embodiment of the present invention is further directed to a method of editing a scene using video metadata where the metadata comprises lighting data, sound data, camera data, object segmentation data, depth map data, and annotation data.

An example embodiment of the present invention is directed to a method of removing an object from the video data and where the video lighting location metadata is applied to determine a background behind the removed object that is consistent with the lighting location metadata for the remainder of the video data.

An example embodiment of the present invention is directed to a method of adding an object to the video data and where the video lighting location metadata is applied to the added object so that it appears as if it was lighted by the light source.

An example embodiment of the present invention is directed to a method wherein editing of the video data analyzes the camera data and location data to combine the video data captured by two or more cameras for the same scene to create a pair of stereoscopic images to present a three dimensional image.

An example embodiment of the present invention is directed to a method wherein the editing of the video removes a sound from the video and where the video metadata is applied so that the removed sound is consistent with the sound data.

An example embodiment of the present invention is directed to a method wherein object segmentation data, depth map data, and annotation data is used to identify the object to be removed.

An example embodiment of the present invention is directed to a system comprising a player receiving video data to be displayed on a display, the video data comprising a video identifier, querying a server with the video identifier for video metadata, the video identifier identifying the video metadata, receiving the video metadata from the server and editing the video data with the received video lighting location metadata to produce edited video data that relights the video data consistent with the video lighting location metadata; a server storing the video metadata, the video metadata comprising video lighting location metadata describing a location of a light source with respect to a camera capturing the video data, and a display for displaying the edited video.

An example embodiment of the present invention is directed to a method for revising a movie metadata database, the method comprising receiving from a first contributor a first metadata contribution for a video scene, storing the first metadata contribution in a video metadata database, receiving from a second contributor a second metadata contribution for a video scene, the second metadata contribution being received after the first metadata contribution, determining that the second metadata contribution is more accurate than the first metadata contribution, and replacing at least a portion of the first metadata contribution stored on the video metadata database with the second metadata contribution.

BRIEF DESCRIPTION OF THE DRAWINGS

A further understanding of the nature and advantages of the present invention may be realized by reference to the following drawings. In the appended figures, similar components or features may have the same reference label.

Figure 1:
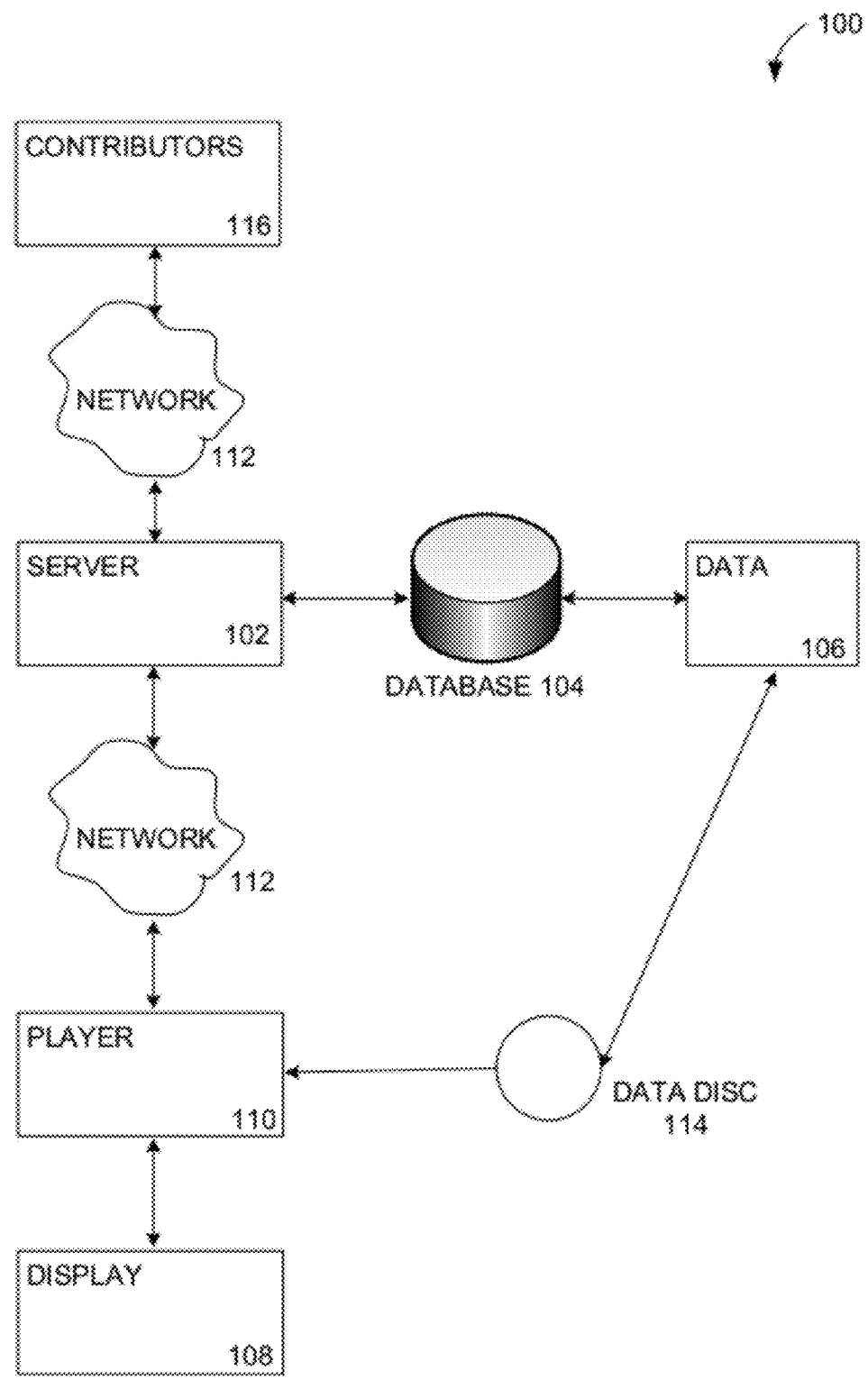
FIG. 1 is a block diagram of a centralized database system for video metadata, according to an example embodiment.

The figures will now be used to illustrate different embodiments in accordance with the invention. The figures are specific examples of embodiments and should not be interpreted as limiting embodiments, but rather exemplary forms and procedures.

DETAILED DESCRIPTION

Music albums stored on compact discs may contain an album identifier which could be used to query a centralized music album database to access music album metadata, such as album name, individual song titles, and artist information. This music album metadata can then be displayed to a user or listener. Similarly, videos can be identified by a video identifier which can be used to query for video metadata. Video metadata may comprise of much more data than music metadata, and may be used for different purposes, such as to edit video or create 3-D images. Thus, there may be a need in the art for a centralized database for 3-D and other information in videos. The video metadata may be accessed by enthusiasts to make edits on their own or by a video player to edit a movie in real time.

A centralized database for video metadata may allow a user or a viewer to query for and receive metadata which may provide valuable video information, and additionally allow video to be edited or displayed in such a way as to be consistent with the properties of the original video. For example, objects added to a scene may be re-lit according to video metadata describing how the remaining scene is lit. The centralized database may contain annotation data and data submitted by a party associated with the creation of the video or from an unassociated contributor.

Video metadata about camera location and camera movement in relation to objects in a scene and their movement may allow for the generation of three dimensional images and video. Moreover, lighting and sound metadata may allow for objects and sounds to be added and removed from a scene with proper lighting and sound effects. Video metadata may also allow for various attributes of a video to be edited, such as brightness, contrast, etc. In addition, object metadata may be used to identify objects and characters in a scene which may be used in editing or to provide annotations. Depth metadata, object segmentation data, and other video metadata may be used to further augment 3-D effects or assist in video editing.

In an example embodiment, metadata describing the motion of the camera relative to objects in a scene over a period of time can be used to produce two images, one image of an object at an earlier time and the other image of the same object at a slightly later time. The two images may be slightly different and may be used in conjunction with the metadata to determine how the object was moving in relation to the camera and other objects in the scene in order to produce a pair of stereoscopic images that may be the basis for a three dimensional image. In a further embodiment, lighting data, such as the type of light, light intensity, and location of the light source relative to the scene allows for new objects, such as digitally created objects, to be added to a scene with proper lighting. New objects can also be added to a scene and incorporate sound data to properly create new sounds. Similar techniques can be used to remove objects or sounds from a scene or to edit a scene's light and sound qualities.

In a further embodiment, an object of unknown geometry may be re-lit and a visual hull of the object can be created from a set of reference images where the object is stationary but an illuminating light source is rotated. In this technique, multiple references images, such as multiple still photographs, of the object are combined to create a composite image. In each of the reference images, the light source is moved to a slightly different position. This set of reference images is then merged into a composite image file containing information about the location of the light source and the reflectance of the object under varying lighting conditions. With this lighting metadata, it is possible to map how the object responds to light and to relight the object virtually. This composite image will display the image and allow the light source to be moved over the image, showing an animated progression of the light source's movement. This technique make may colors, textures, and marks more clear. In an example embodiment, a polynomial texture map is used to create the composite image. In a further embodiment, the composite image is a parametric photograph. The re-lighting of an object may utilize bidirectional reflectance distribution functions.

Additionally, a visual hull of the object may be determined by geometric approximation using a shape-form-silhouette reconstruction method. These methods exploit the fact that the silhouette of an object in an arbitrary view re-projects onto a cone in 3-D space. All the space occupied by the object must lie somewhere inside the cone. After intersecting all cones from all possible views, we obtain a conservative estimate of the object's geometry, which is called a visual hull.

In an example embodiment, a video may be captured with high dynamic range rendering, where the scene is captured in a larger dynamic range and later combined to preserve details at limited contrast ratios. For example, a single scene may be recorded with two cameras, one with a high dynamic range and the other with a low dynamic range. The video of the same scene may later be combined to show more details.

In an example embodiment, video metadata is used in video matting processes. Film-based blue screen matting techniques are popular, but require the use of carefully control uniformly colored backgrounds. However, other techniques, such as natural image matting, have shown that foreground objects can be extracted from regular images once an outline of an object has been drawn. Video metadata can identify the outline of an object and further processing can identify the object itself. In a further embodiment, hand drawn trimaps that delineate the foreground, background, and unknown regions can be propagated through time using optical flow techniques. These techniques can rely on metadata to assist in the identification of foreground objects.

The centralized database may be populated with metadata provided by parties associated with the capture of the video. For example, a production company involved in the filming of a video may provide the metadata captured by their cameras and available from their documentation directly to the centralized database. The location of the cameras and other equipment may be captured by tracking devices. In another embodiment, the centralized database may be open to contributor input, where contributors may be a party unassociated with the filming of the video. Parties unassociated with the filming of a video, such as a video viewer, may submit metadata to the database, such as metadata identifying characters and objects in a scene. In an example embodiment, the contributors may submit metadata over the internet. The metadata for a video may be organized by a community, such as with a "wiki" format. The metadata may be organized and updated by a community of contributors. The video metadata wiki may be edited by any user. Thus, an individual contribution may be replaced by a later contribution the community judges are more accurate.

This description provides examples only and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

FIG. 1 is a block diagram of a centralized database system 100 for video metadata, according to an example embodiment. The database 104 may be a centralized server for storing data 106, the data 106 comprising video metadata such as 3-D and other video information. The video metadata may comprise camera, lighting, sound, object, and depth data. The video metadata may also include production or editorial data, credits information and annotation data. In an example embodiment, the video metadata may comprise of data submitted by contributors. The data 106 may also comprise of three dimensional data, such as the location and video for multiple cameras and data describing a pair of stereoscopic images.

The data 106 stored on the database 104 may be accessed through a server 102. The server 102 may be a web server, an FTP server, a server hosting APIs, or a server that is connected to and provides data through a network 112. In an example embodiment, the network 112 may be the internet, an intranet, an extranet, a mobile network, or a telecommunication network. A player 110 processes video data which may be transmitted and displayed on a display 108. The player 110 may be a digital video disc (DVD) player, 3-D processor, a game console, a hand held device, a mobile phone, or any device capable of processing video data for display. The video information processed by the player 110 is displayed on the display 108. The player 110 may be connected to the display 108. The display 108 may be a television, a plasma screen, a mobile phone, a computer screen, a portable computation device with a screen, or any device capable of displaying video. The player 110 may communicate through the network 112 with the server 102. The player 110 may query the server 102 to access the database 104 for data 106 associated with a video the player 110 is processing. In an example embodiment, the player 110 will send a video identifier to the server 102 to access the video metadata associated with the video played by the player 110 and identified by the video identifier. The player 110 may transmit video metadata retrieved from the database 104 or the server 102 to the display 108. In an example embodiment, the player 110 may process the video metadata received from the server 102 to augment or edit the video. In an example embodiment, the player 110 may retrieve video data from a data disc 114. The data disc 114 may contain some of the data 106 stored on the database 104 and may contain the video data and the video identifier used to query the server 102. The player 110 may simultaneously display the data stored on the data disc 114 and data retrieved from the database 104. The data 106 may also be contained with downloaded or streamed data.

In an example embodiment, individual contributors 116, may communicate with the server 102 through the network 112 to submit video metadata contributions. The contributors 116 may be individual viewers unassociated with the creations of the video, or may be parties directly involved in the creation of the video. The contributors 116 may add metadata by communicating with the server 102, such as by submitting contributions through a web interface. The metadata contributions may be stored in the database 104 for later retrieval. The submitted metadata may be retrieved by the player 110 or by other contributors 116. In an example embodiment, the data 106 stored in the database 104 may be accessible over a network 112, such as to internet users on a website. The metadata may be open and accessible to internet users in general or a subset of preselected internet users. In an example embodiment, the contributors 116 may provide annotations or comments. The annotations and comments may be valid for a particular scene, over a period of time in the video, or may describe the video in its entirety. The contributors 116 may provide metadata such as identifying objects in a scene or identifying lighting, sound, and other data. Other methods of contributing data to the database 104 may also exist, such as through data entry directly to the server 102. In an example embodiment, the video metadata contributions are estimates or approximations and may be later replaced with more accurate data.

Figure 2:
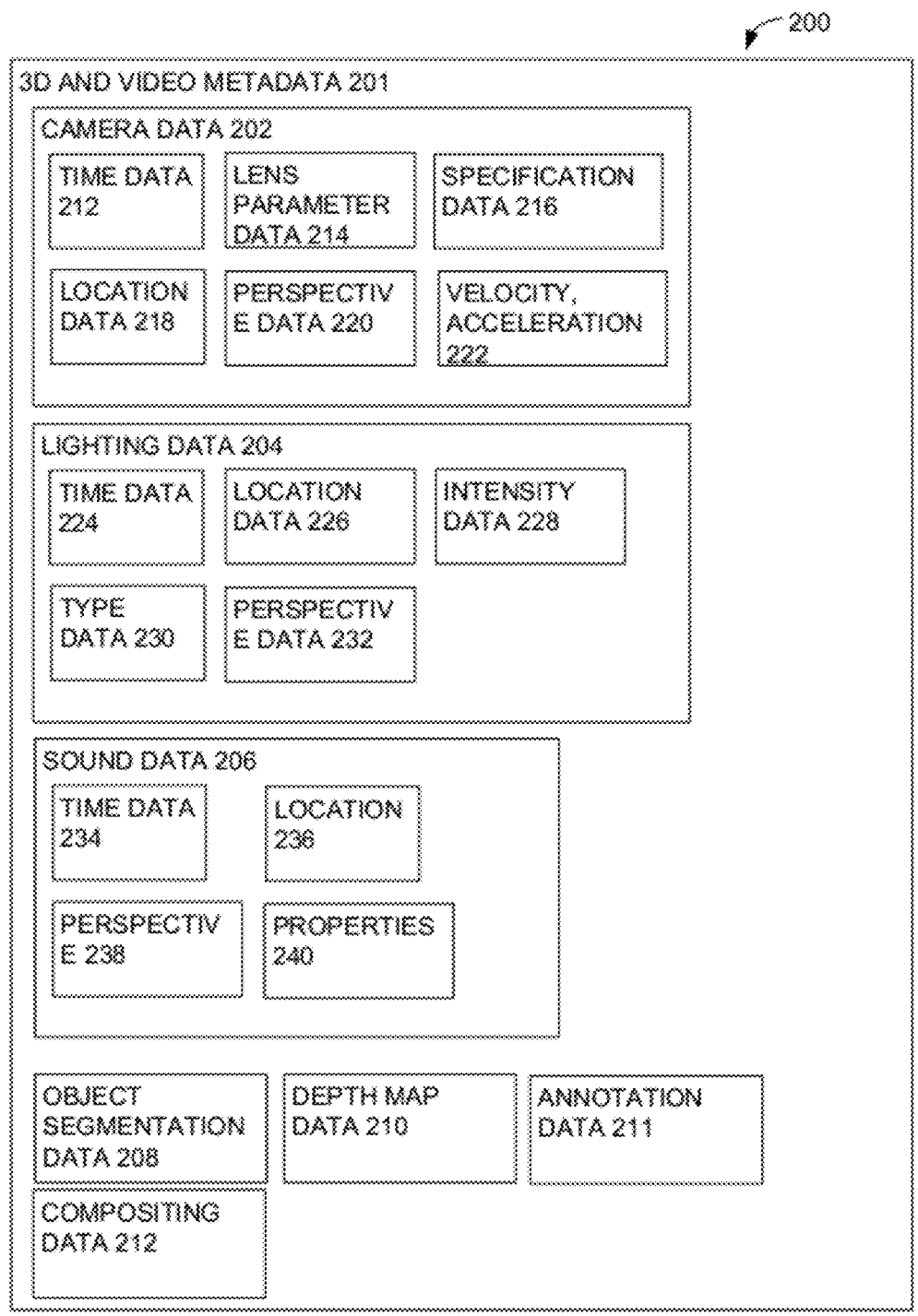
FIG. 2 is a block diagram of the type and organization of video metadata stored in a centralized database, according to an example embodiment.

FIG. 2 is a block diagram of the type and organization of video metadata stored in a centralized database 200, according to an example embodiment. The 3D and video metadata 201 stored by a centralized server may comprise of camera data 202, lighting data 204, sound data 206, object segmentation data 208, depth map data 210, and annotation data 211. The video metadata may be stored at a granularity of a single frame. The video metadata may be sparse and in an example embodiment, the minimum granularity is a single frame.

In an example embodiment, the camera data 202 may comprise of time data 212. Time data 212 may indicate the exact time or times at which a particular scene, frame, or video was captured. Time data 212 may indicate the day, month, hour, minute, second, and year. Time data 212 may also comprise time zone data, seasons data, and the length of the video and time remaining in a video. Time data 212 may be used to analyze videos and frames relative to each other, such as describing the length of a movie scene or chapter of a video and may be used in conjunction with other metadata.

In a further embodiment, the camera data 202 may comprise of lens parameter data 214. Lens parameter data 214 may describe the attributes of the camera lens as it is capturing video or images. For example, lens parameter data 214 may describe the zoom of the lens, the size or opening of the aperture, shutter speed when appropriate, whether the lens is wide angle or macro, the status of image stabilization functions, the brand and model of the lens, and other lens parameters and configurations. The lens parameter data 214 may be analyzed so that edits to a scene look as if they were filmed with a lens having similar parameters.

In an example embodiment, the camera data 202 may comprise of specification data 216. The specification data 216 may describe attributes of the camera as it is capturing videos or images. For example, specification data 216 may comprise white balance, ISO, frame rate, gamma, sharpness, brightness, contrast, data compression format, the brand and model of the camera, and other settings. The specification data 216 may describe settings of the camera and the qualities of the sensor. The specification data 216 may be analyzed so that edits to a scene look as if they were filmed with a camera having similar settings.

In another example embodiment, the camera data 202 may comprise of location data 218. Location data 218 may describe the location of the camera as it is capturing video data. For example, location data 218 may be GPS data, longitude and latitude coordinates, or may be data describing a particular location, such as an address or location name, e.g., "Central Park." The location data 218 may describe location in relation to other objects, such as "10 feet behind the cliff." The location data 218 may also be described relative to an object in or out of scene or relative to a scene, such as relative to the object in focus. For example, location data 218 may describe that both a camera and an object in the scene are moving at a certain rate in a certain direction.

Camera data 202 may also comprise of perspective data 220. Perspective data 220 may describe the perspective of the camera at a particular location. For example, perspective data 220 may describe the direction and angle the camera is facing. Perspective data 220 may describe the angle of the camera along X, Y, and Z axes. Such data may describe the height of the camera, the direction it is facing, and whether it is pointing up or down. The perspective data 220 may be described in multiple ways, such as using the north/south/east/west measure or by the angle or degree or rotation.

The camera data 202 described so far may be captured over a period of time. For example, the location data 218 and perspective data 220 of a camera may be captured over a period of time, and may be combined with time data 212, so as to illustrate motion. Other camera data points, such as lens parameter data 214 and camera specification data 216, may also be captured over a period of time, for example, to record how the parameters change over a ten minute movie. From the time based data, the velocity and acceleration 222 of the camera may be derived. For example, a camera can be measured moving from point A to point B at a certain rate of velocity and acceleration, while next moving from point B to point C at another rate of velocity and acceleration. The camera data 202 may also describe more than one camera. For example, the location and settings of two or more cameras may be recorded over time.

The 3D and video metadata 201 may comprise of lighting data 204. The lighting data 204 may comprise of time data 224, similar to the format of the camera time data 212, but relative to a light source. The time data 224 may describe a light source at a particular point in time and may be used to track a light source to later edit a scene. The time data 224 may also describe a light source with respect to a particular frame within a sequence of frames. For example, the data may track how a light source may change over time. In an example embodiment, the lighting data 204 may comprise of location data 226, similar to the format of the camera location data 218, but relative to a light source. The location data 226 may describe the location of a light source and may be used to later edit a scene. For example, location data 224 may be described in terms of longitude and latitude coordinates or through GPS data. The location data 224 may also be relative to a scene or an object in or out of the scene. For example, a light source may be described as being 10 feet behind and 10 feet to the left of a main camera.

The lighting data 204 may comprise of intensity data 228, type data 230, and perspective data 232. Intensity data 228 may describe the brightness or wattage of a particular light source. Type data 228 may describe the type of light and other qualities of a light source, such as the color, temperature, focus, size of the pool light, length of throw, dimmer level, the object of focus, and the use of any masking devices such as shutters or barn doors or other devices. Perspective data 232 may describe the perspective of a light source at a location, with a similar format to the camera perspective data 220. The perspective data 232 may describe the angle and direction of the light source, similar to the format of the camera perspective data 220. In an example embodiment, perspective data 232 may be described in terms of X, Y, and Z axes. Various types of lighting data 204 may be combined with time data 224 to analyze a light source over time, such as to derive velocity and acceleration. The lighting data 204 may also describe more than one light source. For example, the location and properties of two or more light sources may be recorded over time. The lighting data 204 may also describe the location of a light source with respect to a station object, such as to create a composite image, a polynomial texture map, or a parametric photograph. The lighting data 204 may also describe high dynamic range rendering data.

The 3D and video metadata 201 may also comprise of sound data 206. Sound data 206 may describe sounds within a video. In an example embodiment, the sound data 206 comprises of time data 234, similar in format to the camera time data 212. The time data 234 may record a sound source, such as the mouth of actors or the location of a car horn, or a sound recording device, over time. Time data 234 can describe both a sound source or a sound recording device. The time data 234 may also describe a sound source or recording device with respect to a particular frame within a sequence of frames. In an example embodiment, the sound data 206 may comprise of location data 236, similar in format to the camera location data 218. Location data 236 may describe the location of recording devices, such as microphones, or of a sound source. Location data 236 may be described in terms of GPS coordinate data, longitude and latitude, or relative to other objects in the scene. Sound data 206 may comprise of perspective data 238, similar to the format of camera perspective data 220. Sound perspective data 238 describes the angles and direction of sound sources, such as measured by the X, Y, and Z axes. For example, sound perspective data 238 and sound location data 236 may indicate that a sound source is coming from behind and above a main camera. In an example embodiment, the sound data 206 may comprise of sound properties data 240. The sound properties data 240 may describe qualities of the sound recorded, such as pitch, loudness, phase, direction, distance, timbre, whether the sound is in mono, stereo, surround sound, echo, or other sound output configurations. The sound properties data 240 may also describe properties of the sound recording devices. Various types of sound data 206 may be combined with time data 234 to analyze a sound source or sound recording device over time, such as to derive velocity and acceleration. The sound data 202 may also describe more than one sound source or sound recording device. For example, the location and properties of two or more microphones may be recorded over time. Sound data 206 may also describe music, such as song title, artist, soundtrack and score data, copyright, notes being played, instruments being played, and lyrics. Sound data 206 may also describe the content of the sound, such as subtitles, etc. In an example embodiment, some sound may not have a source, such as a narrative voice. The sound data 206 may also describe language data and may map how sounds are to be outputted on multiple speaker systems, such as 2.1, 5.1, and 7.1 audio systems.

The 3D and video metadata 201 may also include object segmentation data 208. Object segmentation data 208 may describe and identify specific objects within a scene. For example, object segmentation data 208 may describe that a certain yellow group of pixels in a two dimensional scene is a yellow telephone. Such object segmentation data may be the result of image processing or may be deduced from an original three dimensional object before digital video was rendered. In an example embodiment, individual contributors may view a video and may submit data to a centralized database identifying objects in the video. For example, viewers of the video may identify objects in the video and upload their identification to a centralized video metadata database. Objects can be identified by names, ages, biographies, date of birth, and other data. Object segmentation data 208 may be used to remove or add objects to a scene or to edit a scene. The object segmentation data 208 may also describe more than one object. The object segmentation data 208 may comprise of user contributed identification of objects, such as identifying the outline of an object. It may also describe a visual hull.

The 3D and video metadata 201 may comprise of depth map data 210. Depth map data 210 identifies the distance of objects in a scene relative to the camera. For example, depth map data 210 may describe that the tree within a scene is 100 meters away, while a cup is only 100 centimeters away. In an example embodiment, depth may data 210 may be captured or interpolated from a plurality of cameras, or it may be added by a contributor. Depth map data 210 may be used in the presentation of 3-D images or in editing a scene. Depth map data 210 may describe a plurality of objects.

The 3D and video metadata 201 may also include annotation data 211. Annotation data 211 may comprise of annotations, comments, descriptions, summaries, and descriptions of scenes, video segments, or objects in a scene. Annotation data 211 may be provided by the parties that created the video or it may be presented by contributors unassociated with the video production. Annotation data 211 may be presented to a viewer by querying a centralized database. The 3D and video metadata 201 may also include other forms and means to organize metadata.

The 3D and video metadata 201 may also include compositing data 212. Compositing data 212 supports video made through the composition of multiple layers. For example, compositing data 212 could describe a background and foreground of the scene as separate layers that are later combined to create the final video. Thus, compositing data 212 describing the background could be used to edit a scene if an object from the foreground is removed. In an example embodiment, the 3D and video metadata 201 may also include bidirectional reflectance distribution function data and data describing objects and settings not contained in the scene.

Figure 3:
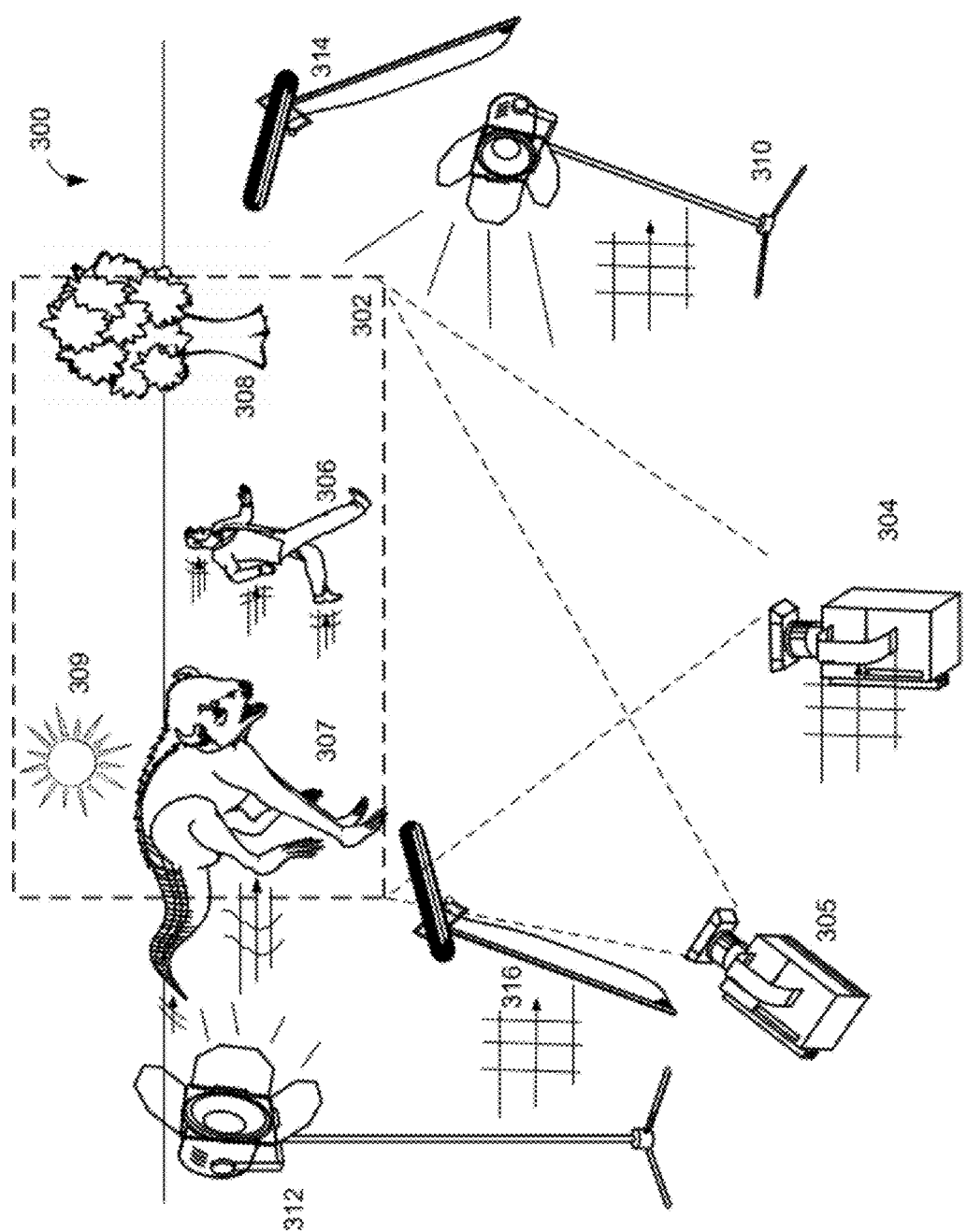
FIG. 3 is an example setting describing where and what video metadata is captured and recorded, according to an example embodiment.

FIG. 3 is an example setting where video metadata is recorded 300, according to an example embodiment. In this setting, a scene 302, as indicated by the dotted rectangle, represents the dimensions of the image or video being captured by a first camera 304. In the foreground of the scene 302, a person 306 is running towards the right edge of the scene 302. Following the person 306 is a beast 307, that is also moving toward the right of the scene 302, but is traveling at a higher velocity than the person 306. Slightly behind the person 306 and the beast 307 is a stationary tree 308. In the background of the scene 302 is a sun 309, which is also stationary and is illuminating the objects in the scene 302 (the person 306, the beast 307, and the tree 308).

Also illuminating the scene are two light sources 310, 312. Each light source 310, 312 is at a different location, is a different distance from the scene 302, is titled at a different angle, and is held at a different height. The wattage, type, lighting effects, and other lighting attributes and settings may vary across the light sources 310, 312 as well. The light source 310 is moving to the right of the scene.

The first camera 304 is also moving to the right edge of the scene 302. The first camera 304 may be moving at a rate equal to or different from that of the person 306 or the beast 307. A second camera 305 captures the same scene 302 from a slightly different angle than the first camera 304. The second camera 305 is at a different location and angle and is stationary. The second camera 305 may also be at a different height and may use different lens parameters and camera settings Two recording devices 314, 316, such as microphones, record sound sources. The two recording devices 314, 316 may exist at different locations, may rest at different heights, may be positioned from different perspectives and angles, and may utilize different settings. The recording devices 314, 316 may record sounds from various sound sources, such as the person 306 or the beast 307. The recording devices 314, 316 and the sound sources 306, 307 may move over time. In this example, recording device 316 is moving to the right.

This setting 300 illustrates the type of data that may be described by video metadata. For example, camera metadata may describe the location of the first camera 304 in relation to the objects in the scene 302. Using time and location data, metadata may also describe the motion of the first camera 304 in terms of attributes such as velocity and acceleration. Camera metadata may also describe the location of the second camera 305 and its position over time in relation to the first camera 304 and the objects in the scene 302. Perspective metadata can describe the angle, height, and rotation of the cameras 304, 305, for example along an X, Y, and Z axes. Camera metadata may also record the settings and attributes of cameras 304, 305 and the lenses recording the video.

Light metadata may describe the location of the light sources 310, 312 and the sun 309, in general, in relation to each other, and in relation to objects in the scene 302. Time and location data may be used to determine the motion of the light sources 310, 312 and the sun 309, and attributes such as velocity and acceleration. Light metadata may also capture attributes and settings of the light sources 309, 310, 312, such as the type and intensity of the light. Light metadata may also capture natural light sources, such as the sun 309, reflections, or indirect light sources.

Sound metadata may describe the location of the recording devices 314, 316 and the sound sources 306, 307 in general, in relation to each other, and in relation to other objects in the scene 302. For example, it can be determined that the sound of footsteps is coming from the ground where the person 306 is stepping. Time and location data may be used to determine the motion of the second record device 316 and the sound sources 306, 307, and attributes such as velocity and acceleration. Sound metadata may also capture the properties of the recording devices 314, 316, such as sensitivity.

Object segmentation data may identify objects in the scene 302. For example, object segmentation data would be able to recognize the person 306, the beast 307, the tree 308, and the sun 309 from each other. Object segmentation data may also describe elements of each object, such as the arms and legs of the person 306. Object segmentation data may track an object over a period of time, for example, recognizing the person 306 and the beast 307 as they run across the scene 302. Depth map data may describe the distance of objects from the recording camera. For example, a depth map may show that the person 306 and the beast 307 are both twenty feet from the camera and that the tree 308 is three hundred feet from the camera.

Figure 4:
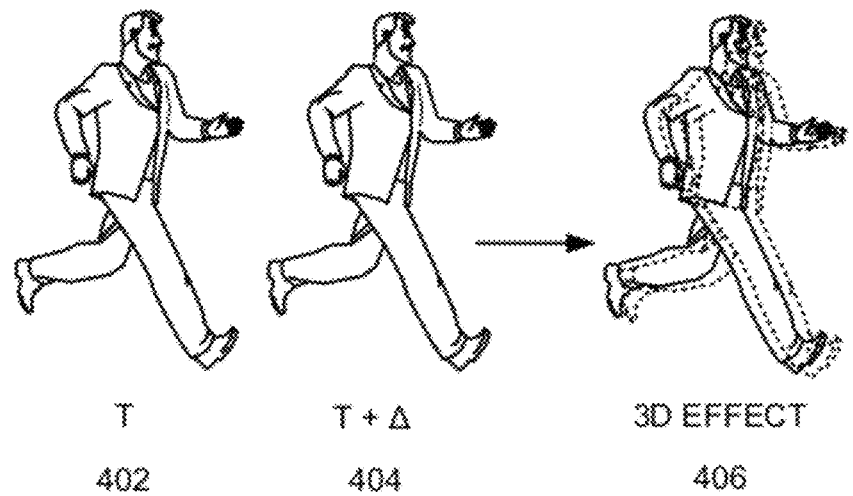
FIG. 4 is a diagram illustrating the combination of two 2-D images gathered over a period of time to produce a 3D image.

FIG. 4 is a diagram illustrating the combination of two 2-D images gathered over a period of time to produce a 3D image. A left image 402 is the image of the object of a person at a time T. Right image 404 is an image of the same object of the person at a slightly later time of T+Δ. The left image 402 and right image 404 may be slightly different, as the object may move during the time Δ. The images 402, 404 may be used as a pair of stereoscopic images to create a three dimensional image. In an example embodiment, video metadata may be utilized to create the three dimensional image. For example, location, time and object data may be used to identify the objects in a scene and in the direction they are moving in order to properly create the three dimensional image. The velocity and acceleration of an object in a scene relative to a camera may also be used. For example, if a camera mounted on a car traveling at fifty miles per hour is filming a train traveling in the same direction traveling at fifty five miles per hours, then the three dimensional effect should make it appear as if the train is moving forward while the background may remain two dimensional.

In an example embodiment, the two stereoscopic images may also be generated by combining two images from two or more cameras filming the same scene. For example, the video metadata may indicate that two cameras filming the same scene are 20 degrees apart. Using the video metadata, a pair of stereoscopic images may be interpolated from the two cameras. In an example embodiment, the video metadata, such as object segmentation and depth data, may be used to create three dimensional images. The degree of separation may be small and may be combined with more than two cameras to produce a plurality of 3-D images.

In an example embodiment, a process to convert a two dimensional video into a three dimensional video may also analyze the video metadata. For example, lighting and camera data may be taken into consideration to identify objects in a scene and calibrate three dimensional rendering. In addition, object and depth data may be used to identify objects which should be project in three dimensions.

Figure 5A:
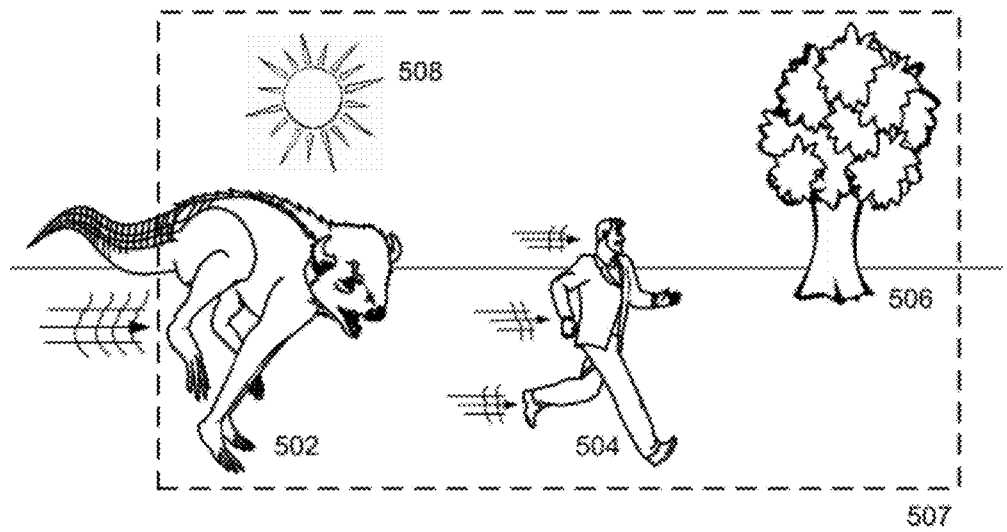
FIG. 5A is a diagram of a scene, according to an example embodiment.

FIG. 5A is a diagram of a scene 507, according to an example embodiment. In this scene, a beast 502 is chasing a person 504. In the background is a stationary tree 506 and a sun 508 that illuminates the scene. In an example embodiment, metadata relating to the filmed scene may be stored in a centralized database for video metadata.

Figure 5B:
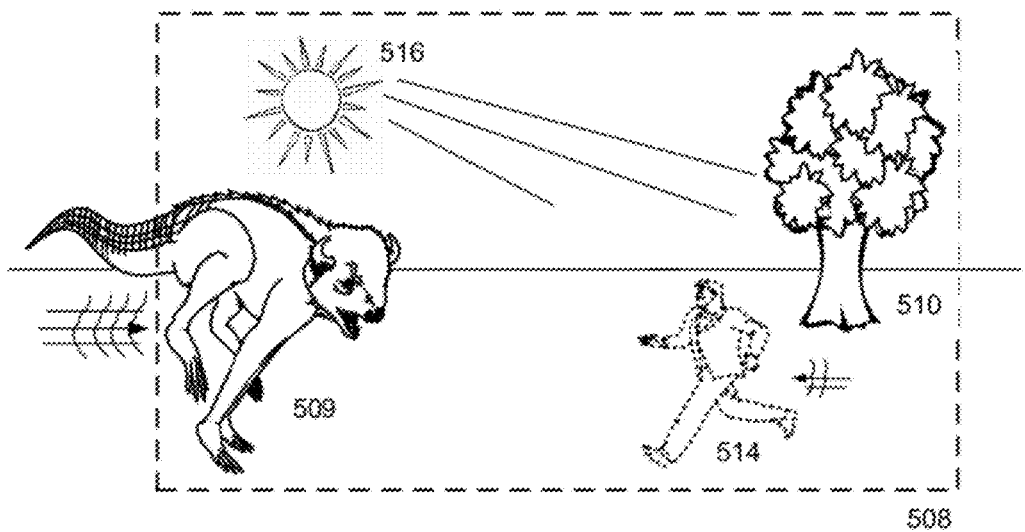
FIG. 5B is a diagram of the scene of FIG. 5A with elements added and removed, according to an example embodiment.

FIG. 5B is a diagram of the scene 508 of FIG. 5A with elements added and removed, according to an example embodiment. The metadata stored with a centralized database may be used to edit a scene or video. In this example, the person 504 in the original scene 507 has been removed in the current scene 508. The video metadata may be used to properly remove an object from a scene. In an example embodiment, time and location information may be used to infer or determine what the background behind the removed person 504 in the scene looked like by finding an image of the scene at another time. For example, the metadata may indicate that a prior frame includes the same background without the person 504, where the camera is in the same location and perspective and the lighting data is the same, and where the background may simply be imposed on the new scene 508. In an example embodiment, the video metadata may indicate that a prior frame contains the background with slightly different qualities, such as different camera or lens parameters or different lighting or location data. In this case, the metadata may be used to adjust the prior frame to best match and make compatible with the video metadata settings of the current frame. For example, if the prior frame has one less light source than the new scene 508, the background from the prior scene may be relit with a simulated additional light source using the video metadata. In a further embodiment, the same background filmed from a slightly different perspective may similarly be edited using the location metadata to be extrapolated to fit the new scene 508. Moreover, lighting and camera data may be used to remove shadows and properly fill in the void left by the objects. Object segmentation and depth map data may also help identify the object to be removed from the scene.

Sound data may be used to remove the sounds produced by the object, such as the sound of the person 504 running. In an example embodiment, the sound that corresponds to the time where the removed person's foot hits the ground may be removed from the video. In an example embodiment, sound data relating to a sound source associated with the person 504 may be identified and removed.

A smaller person 514 running to the left has been added to the scene. Video metadata may be used to add and object to the scene. For example, if the object being added to the scene is computer generated, then video metadata corresponding to the cameras, lights, and sounds may be utilized to render the new object so as to look if it were illuminated by similar light as in the original scene 507 and recorded by similar equipment and similar conditions. The sounds produced by the new object 514 may also be processed to correspond with existing soundtracks to make it seem as if it were recorded by the same recording devices.

The sun 516 in the new scene 508 may be adjusted to emit more light. In an example embodiment, a scene may be relit. Here, the metadata describing the light source that is the sun 516 may be adjusted to increase brightness. Such an adjustment may call upon other metadata, such as depth data, object segmentation data, and other data, to relight the scene 508.

Figure 6:
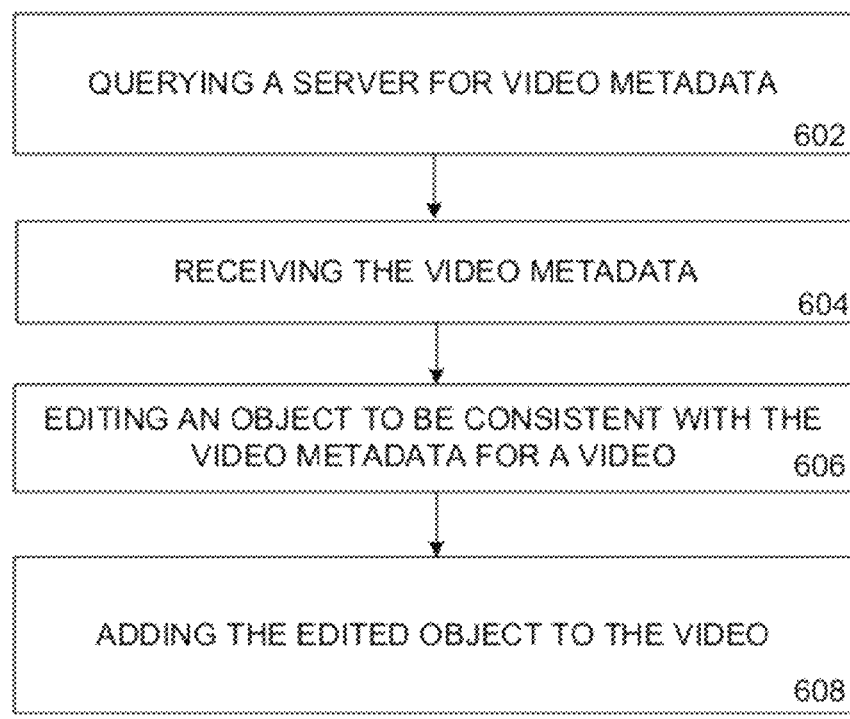
FIG. 6 is a process flow of adding an object to a video, according to an example embodiment.

FIG. 6 is a process flow of adding an object to video, according to an example embodiment. At operation 602 a server for video metadata is queried for video metadata. The query to the server for video metadata may comprise a video identifier. In an example embodiment, the video identifier may be unique alpha numeric string or GUID that identifies unique video metadata entries. At operation 604 the video metadata is received. At operation 606 an object to be added to a video is edited with respect to the received video metadata. In an example embodiment, lighting data may be used to properly light an object. For example, the new object can be edited to appear as if the light sources defined in the lighting data were emitting light on the new object. Moreover, the new object may be emitting sound which can be compared with respect to sound data. The sound for the video may then incorporate the sound from the new object as if it were recorded by the original recording devices. This may preserve surround sound properties. Object and depth data may be used to place the new object in the context of other objects in a video, such as to maintain perspective or shadow effects. Newly added objects may also be added to the video metadata database. At operation 608 the new object is added to the video.

Figure 7:
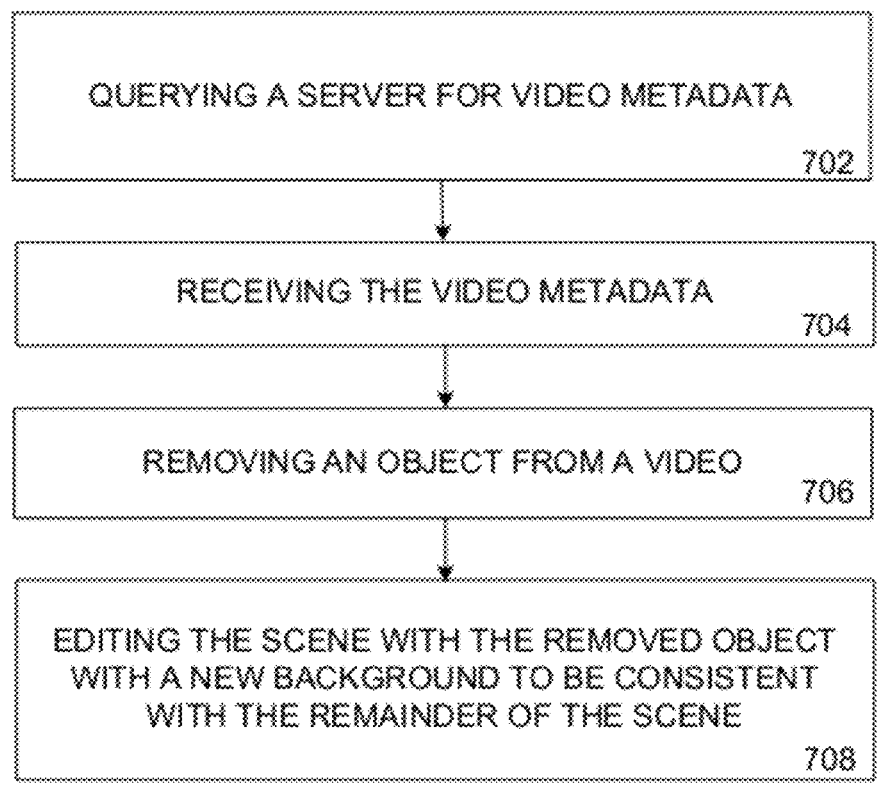
FIG. 7 is a process flow of removing an object from a video, according to an example embodiment.

FIG. 7 is a process flow of removing an object from a video, according to an example embodiment. At operation 702 a server for video metadata is queried for video metadata. The query to the server for video metadata may comprise a video identifier. In an example embodiment, the video identifier may be unique alpha numeric string or GUID that identifies unique video metadata entries. At operation 704 the video metadata is received. At operation 706 an object is removed from the video. In an example embodiment, the object may be identified through the metadata. For example, object, depth, compositing, or annotation data may be able to identify a particular object in a scene, such as a group of pixels in a two or three dimensional display. At operation 708 the empty area left from the removal of the object may be filled in. The video may be edited with a new background consistent with the remainder of the scene. For example, the background behind the removed object may be determined from prior frames of the video. Camera, lighting, compositing, and other metadata may be utilized to extrapolate a background if no exact substitution can be made. In an example embodiment, the metadata may be analyzed to also remove sounds produced by the removed object. For example, if certain dialogue or sounds are associated with the removed object, then they may be removed from the soundtrack.

In an example embodiment, the object to be removed from a scene can be identified using video matting techniques that utilize video metadata to identify the foreground object.

Figure 8:
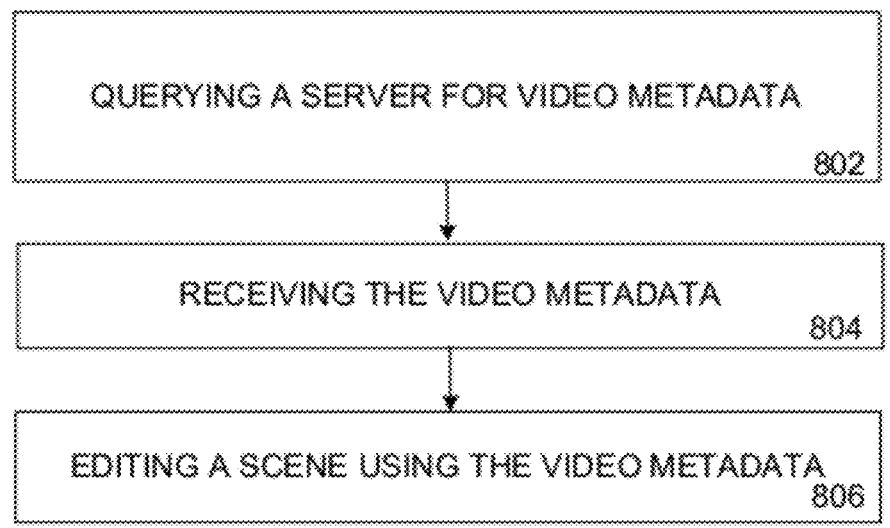
FIG. 8 is a process flow of editing a scene, according to an example embodiment.

FIG. 8 is a process flow of editing a scene, according to an example embodiment. At operation 802 a server for video metadata is queried for video metadata. The query to the server for video metadata may comprise a video identifier. In an example embodiment, the video identifier may be unique alpha numeric string or GUID that identifies unique video metadata entries. At operation 804 the video metadata is received. At operation 806 the video is edited using the video metadata. The editing of the video may analyze the video metadata so that edits are uniformly and consistently applied to the video. For example, adjustments to lighting may be propagated to all objects in the video, and may take into consideration factors such as object and depth data.

In an example embodiment, the scene may be re-lit using a composite image, parametric images, or polynomial texture mapping. Video metadata may be utilized to enable high dynamic range rendering of images and videos. Video metadata describing a visual hull may also be processed to re-light the contour of an object. A scene may be relight using metadata describing the same scene at a different time. For example, metadata may describe the same scene during the day time and the night time. The night time data may be used to relight day time scene into a night time scene.

Figure 9:
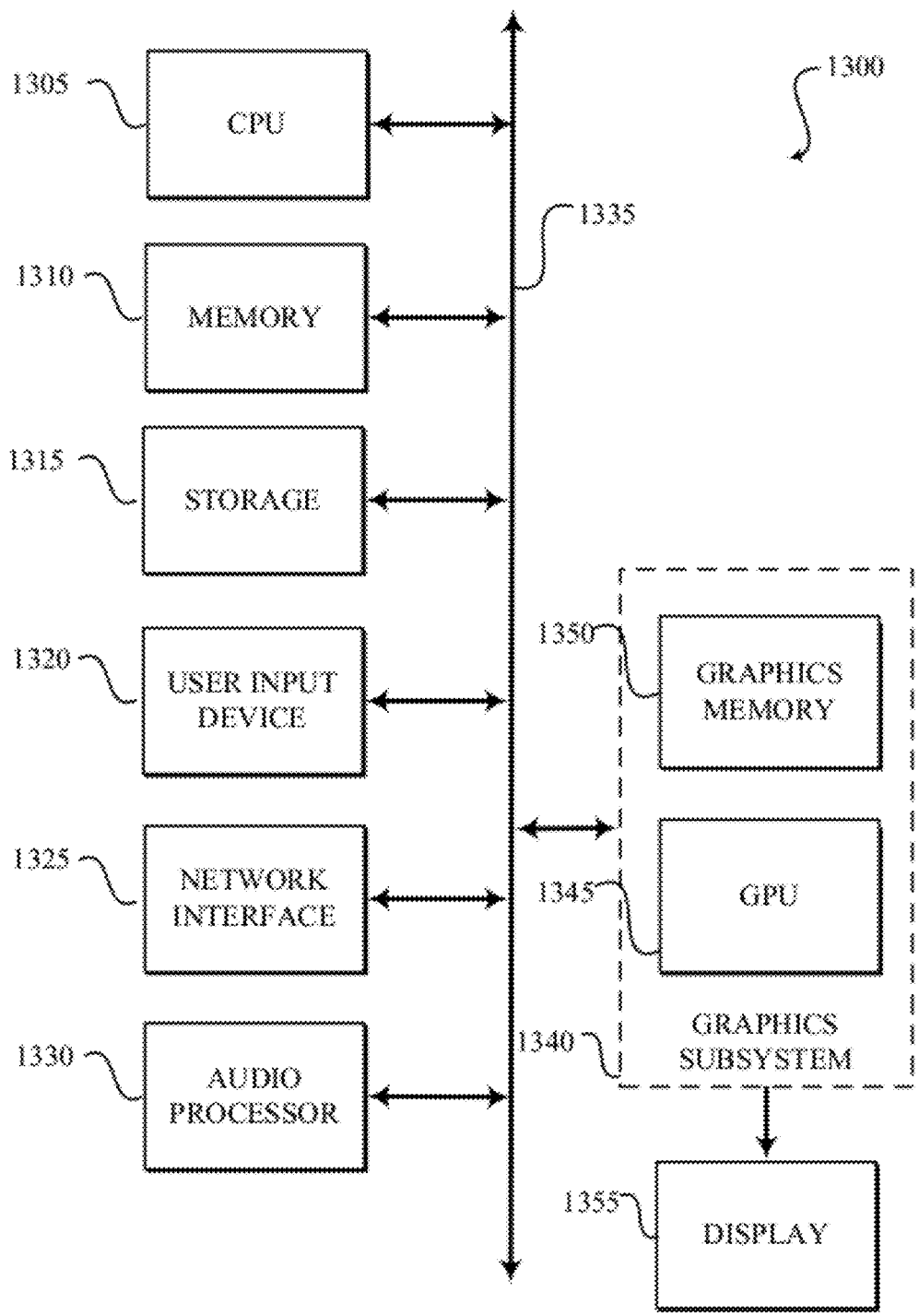
FIG. 9 is an example computer system suitable for use with embodiments of the invention.

FIG. 9 is an example computer system suitable for use with embodiments of the invention. This block diagram illustrates a computer system 1300, such as a personal computer, video game console and associated display (e.g., server 102 and player 110 of FIG. 1), personal digital assistant, or other digital device, suitable for practicing embodiments of the invention. Computer system 1300 includes a central processing unit (CPU) 1305 for running software applications and optionally an operating system. CPU 1305 may be made up of one or more homogeneous or heterogeneous processing cores. Memory 1310 stores applications and data for use by the CPU 1305. Storage 1315 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1320 communicate user inputs from one or more users to the computer system 1300, examples of which may include keyboards, mice, joysticks, touch pads, touch screens, still or video cameras, and/or microphones. Network interface 1325 allows computer system 1300 to communicate with other computer systems via an electronic communications network, and may include wired or wireless communication over local area networks and wide area networks such as the Internet. An audio processor 1330 is adapted to generate analog or digital audio output from instructions and/or data provided by the CPU 1305, memory 1310, and/or storage 1315. The components of computer system 1300, including CPU 1305, memory 1310, data storage 1315, user input devices 1320, network interface 1325, and audio processor 1330 are connected via one or more data buses 1335.

A graphics subsystem 1340 is further connected with data bus 1335 and the components of the computer system 1300. The graphics subsystem 1340 includes a graphics processing unit (GPU) 1345 and graphics memory 1350. Graphics memory 1350 includes a display memory (e.g., a frame buffer) used for storing pixel data for each pixel of an output image. Graphics memory 1350 can be integrated in the same device as GPU 1345, connected as a separate device with GPU 1345, and/or implemented within memory 1310. Pixel data can be provided to graphics memory 1350 directly from the CPU 1305. Alternatively, CPU 1305 provides the GPU 1345 with data and/or instructions defining the desired output images, from which the GPU 1345 generates the pixel data of one or more output images. The data and/or instructions defining the desired output images can be stored in memory 1310 and/or graphics memory 1350. In an embodiment, the GPU 1345 includes 3D rendering capabilities for generating pixel data for output images from instructions and data defining the geometry, lighting, shading, texturing, motion, and/or camera parameters for a scene. The GPU 1345 can further include one or more programmable execution units capable of executing shader programs.

The graphics subsystem 1340 periodically outputs pixel data for an image from graphics memory 1350 to be displayed on display device 1355. Display device 1355 can be any device capable of displaying visual information in response to a signal from the computer system 1300, including CRT, LCD, plasma, and OLED displays. Computer system 1300 can provide the display device 1355 with an analog or digital signal.

In accordance with various embodiments, CPU 1305 is one or more general-purpose microprocessors having one or more processing cores. Further embodiments can be implemented using one or more CPUs with microprocessor architectures specifically adapted for highly parallel and computationally intensive applications, such as media and interactive entertainment applications.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method comprising:
accessing a first version of video data captured by a camera to use in post capture processing by a video player, the video data comprising a video identifier;
querying a server, with the video identifier by the video player, for video metadata stored within a centralized database on the server, the video metadata comprising video lighting location metadata with coordinates of a light source with respect to the camera that captured the video data, and wherein the video metadata comprises time data indicating time information corresponding to the coordinates of the light source during the capture of the video data;
receiving the video metadata by the video player from the server;
editing the first version of the video data with the received video metadata by the video player to produce a second version of the video data, wherein editing the first version of the video data to produce the second version of the video data includes:
determining, based on the time data and the coordinates of the light source, a change in the light source during the capture of the video data; and
producing the second version of the video data based on the first version of the video data, the second version of the video data produced by adjusting light provided by the light source for the second version of the video data for a time period during the capture of the video data, the light being adjusted using the determined change in the light source, wherein adjusting the light provided by the light source for the second version of the video data includes:
adjusting the light for each object of a plurality of objects in the second version of the video data, wherein the light for the object is adjusted based on object segmentation data and depth map data included in the video metadata for the object, and wherein the light for the object is adjusted by:
creating a set of reference images of the object;
rotating the light source for the light provided for each reference image in the set of reference images;
generating a composite image of the object based on the set of reference images after rotating the light source, wherein the composite image includes information about a location of the light source for the reference image after rotating the light source and includes information about a reflectance of the object;
wherein the light for the object in the second version of the video data is adjusted based on the composite image generated for the object, and wherein the composite image of the object indicates an animated progression of a movement of the light source with respect to the object in the image; and
outputting the second version of the video data to a display by the video player while accessing the first version of the video data.

2. The method as in claim 1 wherein the video metadata comprises lighting data, sound data, camera data, the object segmentation data, the depth map data, composition data, and annotation data.

3. The method as in claim 1 wherein editing the first version of the video data includes:
analyzing the object segmentation data, the depth map data, and annotation data included in the video metadata to identify one or more objects to remove from the first version of the video data to produce the second version of the video data after the capture of the first version of the video data by the camera; and
removing the one or more objects from the first version of the video data to produce the second version of the video data after the capture of the first version of the video data by the camera; and
wherein the video lighting location metadata is applied to determine a background behind the removed one or more objects in the second version of the video data, the background being consistent with a background identified based on the video lighting location metadata throughout the capture of the first version of the video data.

4. The method as in claim 1 wherein editing the first version of the video data includes:
adding one or more objects to the first version of the video data to produce the second version of the video data, wherein the one or more objects is added after the capture of the first version of the video data by the camera; and wherein the video lighting location metadata is applied to the added one or more objects to cause the added one or more objects to be lighted by the light source.

5. The method as in claim 1 wherein the change in the light source includes a change in lighting provided by the light source, and wherein the second version of the video data is produced upon assessing that the change in the lighting provided by the light source satisfies a lighting condition.

6. The method as in claim 1 wherein editing the first version of the video data includes:

analyzing camera data and location data to combine the first version of the video data captured by two or more cameras for a scene; and creating a pair of stereoscopic images to present a three dimensional image of the scene in the second version of the video data.

7. The method as in claim 1 wherein editing the first version of the video data includes:

removing a sound from the first version of the video data to produce the second version of the video data; and wherein the video metadata is applied so that the removed sound is consistent with the sound data.

8. The method as in claim 3 wherein editing the first version of the video data includes:

identifying, using the object segmentation data, the depth map data, and the annotation data, the one or more objects to be removed.

9. The method as in claim 1 wherein the video metadata is stored at a granularity of a single frame in the centralized database on the server.

10. The method as in claim 2 wherein the sound data comprises sound location metadata including coordinates of a sound source, and editing of the first version of the video data incorporates the sound location metadata into the second version of the video data.

11. The method as in claim 1 wherein the change in lighting provided by the light source is from a first time period to a second time period, the method further comprising:

assessing whether the change in the lighting provided by the light source from the first time period to the second time period satisfies the lighting condition, the lighting condition being a lighting quality condition;

wherein adjusting the light provided by the light source occurs for the first time period during the capture of the video data, and wherein the light is adjusted based on light provided by the light source for the second time period.

12. The method as in claim 1, wherein the light for the object is adjusted by rotating the light source to a different position for each of a set of reference images that are stationary in the video data that is captured.

13. The method as in claim 1, wherein the composite image is generated using a polynomial texture map, and wherein the composite image is a parametric photograph.

14. A system comprising:

a video player that performs operations comprising:

accessing a first version of video data, the first version of the video data comprising a video identifier;

querying a server with the video identifier for video metadata stored within a centralized database on the server, the video metadata comprising video lighting location metadata with coordinates of a light source with respect to a camera that captured the video data, and wherein the video metadata comprises time data indicating time information corresponding to the coordinates of the light source during capture of the video data;

receiving the video metadata from the server;

editing the first version of the video data with the received video metadata to produce a second version of the video data, wherein editing the first version of the video data to produce the second version of the video data includes:

determining, based on the time data and the coordinates of the light source, a change in the light source during the capture of the first version of the video data; and producing the second version of the video data based on the first version of the video data, the second version of the video data produced by adjusting light provided by the light source for the second version of the video data for a time period during the capture of the video data, the light being adjusted using the determined change in the light source, wherein adjusting the light provided by the light source for the second version of the video data includes:

adjusting the light for each object of a plurality of objects in the second version of the video data, wherein the light for the object is adjusted based on object segmentation data and depth map data included in the video metadata for the object, and wherein the light for the object is adjusted by:

creating a set of reference images of the object;

rotating the light source for the light provided for each reference image in the set of reference images;

generating a composite image of the object based on the set of reference images after rotating the light source, wherein the composite image includes information about a location of the light source for the reference image after rotating the light source and includes information about a reflectance of the object;

wherein the light for the object in the second version of the video data is adjusted based on the composite image generated for the object, and wherein the composite image of the object indicates an animated progression of a movement of the light source with respect to the object in the image; and outputting the second version of the video data for display; and a server that performs operations comprising:

storing the video metadata.

15. The system as in claim 14, wherein the composite image is generated using a polynomial texture map, and wherein the composite image is a parametric photograph.

16. The system as in claim 14, wherein the light for the object is adjusted by rotating the light source to a different position for each of a set of reference images that are stationary in the video data that is captured.

17. The system as in claim 16 wherein the change in the light source includes a change in lighting provided by the light source, and wherein the second version of the video data is produced upon assessing that the change in the lighting provided by the light source satisfies a lighting condition.

18. The system as in claim 14 wherein editing the first version of the video data includes:

analyzing camera data and location data to combine the first version of the video data captured by two or more cameras for a scene; and creating a pair of stereoscopic images to present a three dimensional image of the scene in the second version of the video data.

19. The system as in claim 14 wherein the captured video data is a movie, and wherein editing the first version of the video data includes:

removing a sound from the first version of the video data to produce the second version of the video data; and wherein the operations performed by the server further include applying the video metadata so that the removed sound is consistent with the sound data.

20. A method comprising:

electronically receiving, by a computing resource, a first metadata contribution from a first contributor for a video, the first metadata contribution identifying information about an environment of the video as captured, the first metadata contribution including information enabling a video player to update the video before being displayed on a display, a first version of the video comprising a video identifier, the video player:

querying the computing resource with the video identifier for the first metadata contribution, the first metadata contribution comprising video lighting location metadata with coordinates of a light source with respect to a camera that captured the video, and wherein the first metadata contribution comprises time data indicating time information corresponding to the coordinates of the light source during the capture of the video, receiving the first metadata contribution from the computing resource, editing the first version of the video with the received first metadata contribution to produce a second version of the video, wherein editing the first version of the video to produce the second version of the video includes:

determining, based on the time data and the coordinates of the light source as located during the capture of the first version of the video, and camera movement in relation to an object in the video, a change in the light source during the capture of the video, producing the second version of the video based on the first version of the video, the second version of the video produced by adjusting light provided by the light source for the second version of the video for a time period during the capture of the video, the light being adjusted using the determined change in the light source, wherein adjusting the light provided by the light source for the second version of the video includes:

adjusting the light for each object of a plurality of objects in the second version of the video, wherein the light for the object is adjusted based on object segmentation data and depth map data included in the received first metadata for the object, and wherein the light for the object is adjusted by:

creating a set of reference images of the object;

rotating the light source for the light provided for each reference image in the set of reference images;

generating a composite image of the object based on the set of reference images after rotating the light source, wherein the composite image includes information about a location of the light source for the reference image after rotating the light source and includes information about a reflectance of the object;

wherein the light for the object in the second version of the video is adjusted based on the composite image generated for the object, and wherein the composite image of the object indicates an animated progression of a movement of the light source with respect to the object in the image; and outputting the second version of the video for display;

storing, by the computing resource, the first metadata contribution in a centralized video metadata database;

receiving, by the computing resource, from a second contributor a second metadata contribution for a video, the second metadata contribution being received after the first metadata contribution;

determining that the second metadata contribution is more accurate than the first metadata contribution in describing the coordinates of the light source and the camera movement of the video as captured;

editing, by the video player, the first version of the video with the received second metadata contribution to produce a third version of the video that relights the second version of the video consistent with the coordinates of the light source as located during the capture of the first version of the video and camera movement in relation to the object in the video; and replacing at least a portion of the first metadata contribution stored on the centralized video metadata database with the second metadata contribution.

21. The method as in claim 20 wherein the first contributor and the second contributor are Internet users.

22. The method as in claim 20 wherein metadata stored in the centralized video metadata database comprises camera data, lighting data, sound data, the object segmentation data, the depth map data, and annotation data.

23. The method as in claim 1 wherein the video data is a planar representation of visual information captured by the camera.

24. The method as in claim 1 wherein the video metadata comprises camera movement in relation to one or more objects in the video data, the method further comprising:

editing the first version of the video data with the camera movement to produce the second version of the video data that relights the second version of the video data consistent with the camera movement.

* * * * *

UNITED STATES PATENT AND TRADEMARK OFFICE
CERTIFICATE OF CORRECTION

PATENT NO. : 9,542,975 B2
APPLICATION NO. : 12/911688
DATED : January 10, 2017
INVENTOR(S) : Steven Osman et al.

It is certified that error appears in the above-identified patent and that said Letters Patent is hereby corrected as shown below:

In the Claims

In Column 18, Line 60, please delete "17. The system as in claim 16 wherein the change in the" and enter -- 17. The system as in claim 14 wherein the change in the --

Signed and Sealed this
Thirtieth Day of May, 2017

Michelle K. Lee
*Director of the United States Patent and Trademark Office*